May 29, 1962

W. L. GEIST 3,036,503

METHOD OF MANUFACTURING TELESCOPIC CANS WITH TEAR STRIPS

Filed Aug. 17, 1959

INVENTOR.
WILLIAM L. GEIST
BY
Laurence M. Goodridge
ATTORNEY

May 29, 1962  W. L. GEIST  3,036,503
METHOD OF MANUFACTURING TELESCOPIC CANS WITH TEAR STRIPS
Filed Aug. 17, 1959  6 Sheets-Sheet 2

*INVENTOR.*
WILLIAM L. GEIST
BY
*Laurence M. Goodridge*
ATTORNEY

May 29, 1962 W. L. GEIST 3,036,503
METHOD OF MANUFACTURING TELESCOPIC CANS WITH TEAR STRIPS
Filed Aug. 17, 1959 6 Sheets-Sheet 3

INVENTOR.
WILLIAM L. GEIST
BY
*Lawrence M. Goodridge*
ATTORNEY

May 29, 1962  W. L. GEIST  3,036,503
METHOD OF MANUFACTURING TELESCOPIC CANS WITH TEAR STRIPS
Filed Aug. 17, 1959

INVENTOR.
WILLIAM L. GEIST
BY
*Laurence M. Goodridge*
ATTORNEY

May 29, 1962 W. L. GEIST 3,036,503
METHOD OF MANUFACTURING TELESCOPIC CANS WITH TEAR STRIPS
Filed Aug. 17, 1959 6 Sheets-Sheet 6

*INVENTOR.*
WILLIAM L. GEIST
BY
ATTORNEY 3,036,503
METHOD OF MANUFACTURING TELESCOPIC CANS WITH TEAR STRIPS
William L. Geist, St. Louis, Mo., assignor to R.C. Can Company, St. Louis, Mo., a corporation of Missouri
Filed Aug. 17, 1959, Ser. No. 834,001
26 Claims. (Cl. 93—94)

This invention relates to the art of paper can manufacture and more specifically, to novel methods applicable to the manufacture of a new kind of multi-ply paper tube for a can body. The methods hereinafter described, form from a paper tube made in a single winding operation, a can body with a separable telescopic section, adapted to be closed by metal ends or the like which are in turn, secured to all of the plies of the paper tube to form a hermetically sealed container, suitable for food or the like.

The practice of the disclosed methods form a can body, or a plurality of can bodies, of multi-ply paper, where one of the layers or plies, preferably the outer layer or ply, remains completely intact, whereas, the inner plies are suitably scored to form the telescopic joint. Can ends are then applied, to form a completely imperforate sealed container. Preferably, the outer ply or cover is a label, and is perforated to form a tear strip over the score line in the paper tube, for forming the telescopic section.

The container is opened by removing the tear strip and twisting one of the tube sections forming the body to pull the sections apart. Once opened, the can, can then readily be reclosed but cannot be resealed, so that the re-use is prevented.

The can construction and the methods subsequently described are applied, to a can body formed by spirally winding plies of paper tape to form the several plies or layers, but it should be clearly understood, that this manner of forming the can body is the presently preferred manner, simply, because it is the most inexpensive way of making paper tubes. The tools used subsequently for performing the cuts described herein also, are for purposes of illustration only. Obviously, other tools could be used, and this would occur to those skilled in the art.

It will be also obvious to those skilled in the art, that the instant invention herein disclosed, relates to the generic invention described and illustrated in my co-pending application, Serial No. 816,215 filed May 27, 1959, now Patent No. 2,988,970, dated June 20, 1961.

To my knowledge, there are no known inexpensive methods of producing a can body of the type herein described, wherein the paper tube for a can body is formed in a single winding operation, and subsequent simple operations convert the tube to a can body with a telescoping section and an imperforate outer wrapper, or cover. Heretofore, the known methods would require the wrapper or cover, to be applied after the can body has been completed and the cuts for the telescoping section formed.

This invention discloses several related processes, all of which can be applied to a paper tube, after all the winding steps have been completed. These processes are illustrated as applied to a spirally wound paper tube, but, the process of spirally winding paper tapes to form a can body, comprises steps regarded as well known in the art, and will not be described here in detail. Starting with a tube as long as, or longer, than a single can body, this method includes the steps of:

(1) Forming tubes for individual can bodies with one end stepped externally, and the other end stepped internally.

(2) Forming a circumferential score through the inner plies from the inside out to, but not through, the outer ply or label forming the cover.

(3) Forming a circumferential score line in the outer ply or label, spaced on either side of the line of circumferential score through the inner plies, to define the tear strip in the cover, or label.

(4) Slipping the inner ply with respect to the outer ply, to bring all of the plies toward end-wise alignment.

This method can be carried out in different types of machinery operating in several different ways. Preferably, however, applicant contemplates that the complete tube be formed, simultaneously or continuously, on a spiral winding machine, fed with a number of tapes, such as, three or more, to form a tube with a corresponding number of paper plies.

The spiral winding process is used, to form an inner tube, an outer tube, and apply a label or cover. If, for example, three tapes are used, each tube (inner, outer, and cover) is a single ply formed from one tape, with overlapping edges between convolutions. If five tapes are used, the inside of the second, and fourth, are coated with an adhesive, and the edges only, of the tape for the label or cover of the fifth ply, so that, the first and second ply form the inner tube; the third and fourth form the outer tube; and, the cover is secured to the outer tube by strips of adhesive at each edge of the tape. This same procedure would apply, regardless of the number of plies forming the inner and outer tubes.

When the can bodies are spirally formed, it is usual to have two or more plies of paper, for both the inner and outer tube, in order to hold the tapes together between the separate convolutions, but, of course, it is possible as above noted, to use only one wide tape in the ply for the inner and two for the outer tube which are narrower. In such a case, the strips of adhesive are applied at one edge of the tape forming the inner tube ply, and the adjacent convolutions are overlapped at the glued edge only.

Regardless of how the tubes for the can body are wound, the process-steps above broadly described, will form a telescoping can body, with a tear strip, or a weakened section, at the outer ply, which is frangible to open the container or can. The tube is then provided, with a metal end or the like, which is usually spun on one open end of the tube, so as, to be tightly crimped into sealing relation with all of the plies. The can with one metal cover is usually shipped to the packager, who fills and applies the other cover. The filled container is very strong, and will stand considerable pressure, inside or out, without seepage or contamination.

The user or purchaser, simply twists the ends of the tube forming the can body, one end with respect to the other, to open, or, removes the tear strip and then twists. This separates the tube to form the telescopic cover. The telescoping section can be long enough to dissipate any internal pressure, before the cover is removed. Of course, the can is also capable of being reclosed, if desired, after dispensing a part of its contents, but, it cannot be resealed and can, therefore, be regarded as a non-refillable container.

Further objects and advantages will appear from the following detailed description and the accompanying drawing, which describe and illustrate, the best modes now contemplated for carrying out the invention.

Figure 1:
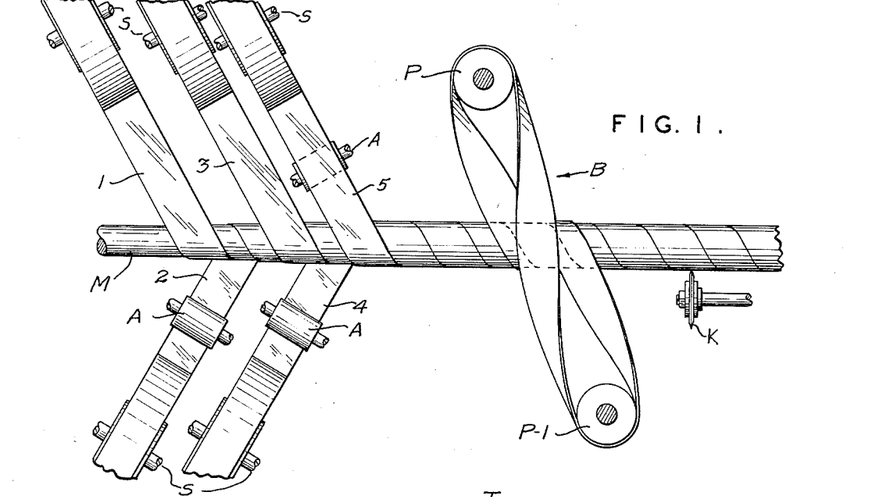
FIG. 1 is a schematic view illustrating the manner of operation and arrangement of parts, in the conventional tube-winding machine, so set-up, as to wind a tube with two inner plies, two outer plies, and a cover ply.

Referring now to the drawings, FIG. 1 illustrates a spiral tube winding machine. This figure shows a horizontal mandrel M about which the tapes are spirally wound, to form the tube. This machine also includes, a driving or winding belt mechanism B which is a twisted belt, one run of which, is looped about the mandrel for rotating the paper tube and causing it to wind and to traverse the length of the mandrel. Adjustment of the pulleys P and P-1 for the driving belt is possible, to vary the spiral lead of the tape, so that, the edges of the tapes preferably are in abutment. Traveling knife K severs the tube at intervals into tubes T, which preferably are the length of several can bodies. The apparatus also includes, a multiplicity of parallel supports for rolls of paper tape, some on one side and some on the other, all of which are indicated as, S. In this particular case, there are five rolls of tape used. Tapes 1 and 2, are adhesively secured together to form an inner tube. Tapes 3 and 4, are adhesively secured together to form an outer tube, and, tape 5 is a cover or label, to which adhesive is applied, preferably, only near opposite edges. The adhesive applying rollers are indicated as A, and operate to coat the inner side of tapes 2, 4 and 5. No adhesive is applied between the tape 2 and the tape 3, since it is desirable, in this process, or in the following processes, to slide the inner tube relative to the outer tube, as one of the steps in forming the telescopic can.

As the tapes are passed between the belt B and the stationary mandrel M, the belt B grips the outer surface of the paper tube formed by the tapes, and causes it to rotate, as well as, to traverse the mandrel M, lengthwise in a direction from left to right, as viewed in FIG. 1. The flying knife K severs the tube beyond the belt B, into individual tubes T which are approximately the length of four cans. The length selected is merely for convenience and subsequent handling.

*Preferred Method*

Figure 2:
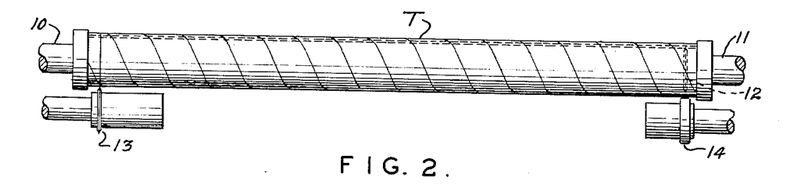
FIG. 2 is a schematic view illustrating the first operation in the preferred method.

The steps in the preferred method for forming the telescopic can body, are illustrated in FIGS. 2 through 11 inclusive, and the following description has reference to these particular figures. As before stated, the length of tubing T, as they are cut off by the flying knife K, are fed to an apparatus, such as illustrated in FIG. 2, which performs the first step of this novel operation. According to FIG. 2, the tube T is first, clamped between two rotating centers, such as, 10 and 11, which are so shaped as to abut the ends of the tube and extend within the tube T, so as to center it. The rotatable center 11, carries an internal knife 12, which rotates therewith. The rotatable center 10, carries an internal extension which projects into the tube and holds it centered. After the tube T is mounted on the centers 10 and 11, rotatable knife 13, is forced against the outside of the tube, at the left end thereof, which cuts through the three outer plies of the tube to, but not through, the inner two plies of the tube, thereby, forming a separation line between the inner tube and the outer tube.

Figure 3:
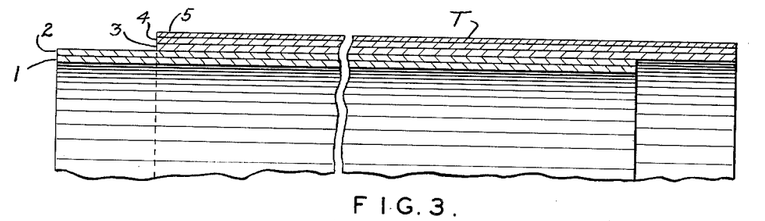
FIG. 3 is a fragmentary sectional view on an enlarged scale, illustrating the tube after the first step in the operation.

At the opposite end of the tube T, roller 14 opposite knife 12, presses the tube T between the knife and the roller, so that the knife 12 cuts through the inner two plies, to the outer tube, but not through the outer tube, so as, to form a line of separation in between the inner tube and the outer tube. When the centers and the knives are withdrawn from the tube T, the waste cut off by the knives 12 and 13 is removed, so that, the resulting structure is as illustrated in FIG. 3. The structure in FIG. 3, therefore, comprises a tube with the right end stepped internally and the left end stepped externally. The plies 3, 4 and 5 are cut away at the left end, and plies 1 and 2 are cut away at the right end.

Figure 4:
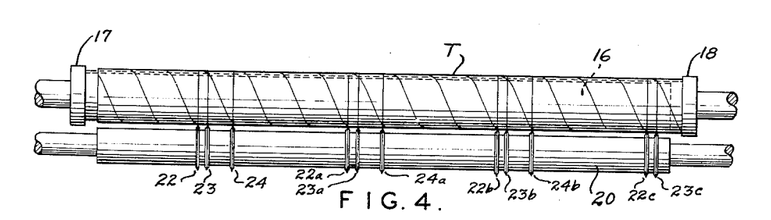
FIG. 4 is a schematic view illustrating the apparatus for performing the second step of the operation.

FIG. 4 illustrates an apparatus for performing the second operation in the method. The tube T as shown in FIG. 3, is mounted on a mandrel 16 with opposite flanged ends 17 and 18 which abut the end of the tube. As the mandrel 16 rotates, the tube T will rotate therewith. The apparatus in FIG. 4, also has a movable mandrel 20, which has a plurality of spaced pairs of knives 22 and 23, 22a and 23a, 22b and 23b. These knives are indicated by like reference numerals because, they are all identical and are spaced in pairs the length of a can body what ever that length may be chosen. Mandrel 20 also carries, knives 24, 24a and 24b, all of which are alike, and are similarly spaced the length of a can body, as are, the pairs of knives 22 and 23, etc.

Figure 5:
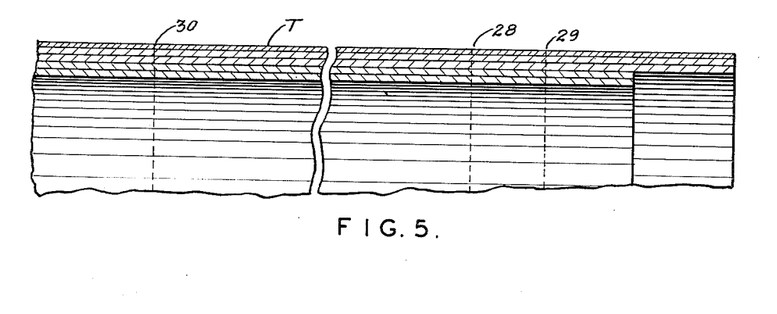
FIG. 5 is a fragmentary view of an enlarged section of the tube after the completion of the second step.

The knives 22 and 23, are dimensioned so as to form the score line in the outer cover or label, whereas, the knife 24 is dimensioned to cut through the plys 3, 4 and 5, so as to leave the inner tube with the plies 1 and 2 intact. After this operation is completed, by forcing the mandrel 20 against the tube T, the tube T is removed from the mandrel centers 17 and 18, and in enlarged cross-section appears as shown in FIG. 5. Tube T, after this operation, has a plurality of score lines, such as, illustrated at 28 and 29, which extend through the cover or label, and a score line such as 30, which severs the three outer plies of the tube. There are several of the score lines 30, as well as, several pairs of score lines 28 and 29, all as shown in FIG. 4.

Figure 6:
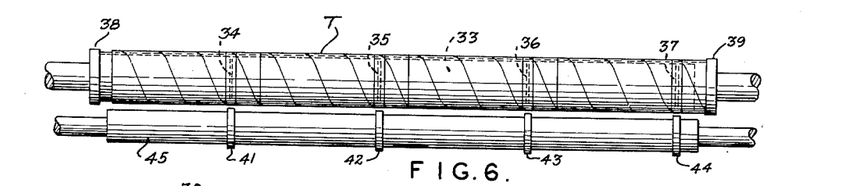
FIG. 6 is a schematic view of the apparatus for performing the third step of the operation.
Figure 7:
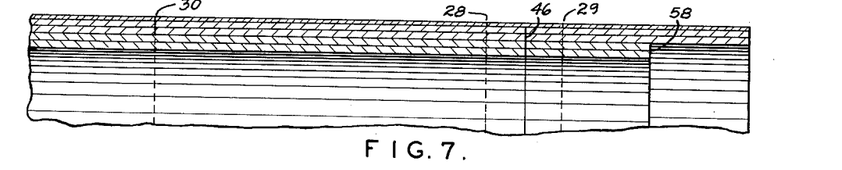
FIG. 7 is a fragmentary sectional view of the tube after completion of the third step.

The apparatus for carrying out the third step in the operation is shown in FIG. 6. In FIG. 6, the tube T is mounted on the mandrel 33, which has a plurality of spaced knives, 34, 35, 36 and 37. The mandrel 33 also has fixed shoulders, such as, 38 and 39, which abut the end of the tube T. As the tube T is rotated on the mandrel 33, the rollers 41 and 42, 43 and 44, which are spaced opposite each of the knives 34, 35, 36 and 37, are brought into contact with the outer surfaces of the tube T, by transverse movement of the mounting mandrel 45, so as, to pinch the tube between the mandrels 33 and 45. This causes the knives 34, 35 and 36 to cut through the four inner plies to the label, at the location of each of these knives. The resulting product is shown in FIG. 7. Note, that in the enlarged view in FIG. 7, the cuts 46 are spaced between scores 28 and 29, in the outer label.

Figure 8:
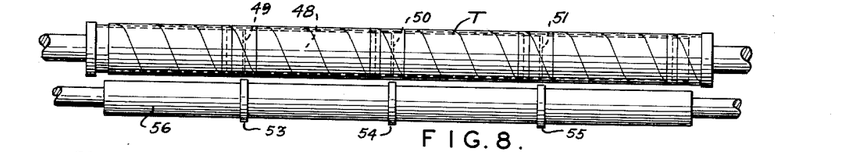
FIG. 8 is a schematic view illustrating the apparatus for performing the fourth step of the operation.
Figure 9:
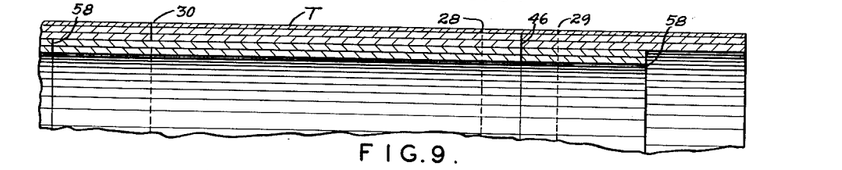
FIG. 9 is a fragmentary view of an enlarged section of the tube after completion of the fourth step of the operation.

The fourth operational step is carried out in the apparatus disclosed in FIG. 8. In this apparatus the tube T is mounted on a mandrel, such as, 48 carrying the knives 49, 50 and 51. Opposed to these knives, and spaced at the same distance are the rolls 53, 54 and 55, mounted on the mandrel 56. When the mandrel 56 is moved, so as, to force the rolls 53, 54 and 55 into contact with the tube T, the knives 49, 50 and 51 are forced through the two inner plies, to form the spaced cuts 58 internally along the length of the tube T. All as shown in the enlarged sectional view of, FIG. 9.

Figure 10:
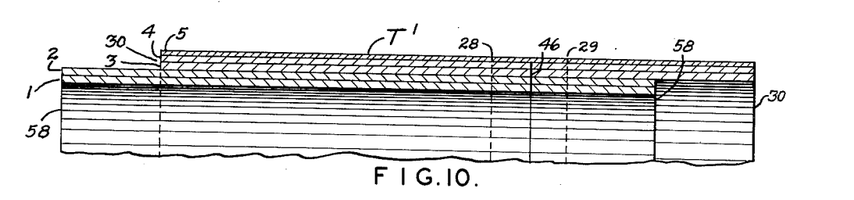
FIG. 10 is a fragmentary view of a single tube, after completion of the fourth step of the operation, and separation of the individual tube.
Figure 11:
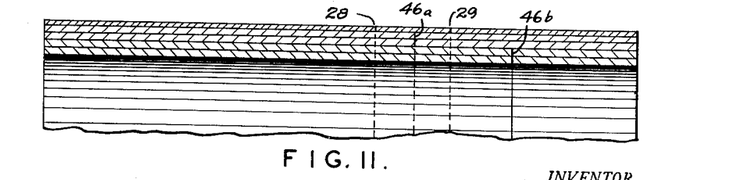
FIG. 11 is a fragmentary sectional view of a tube complete, for forming a can body for a single can.
Figure 12:
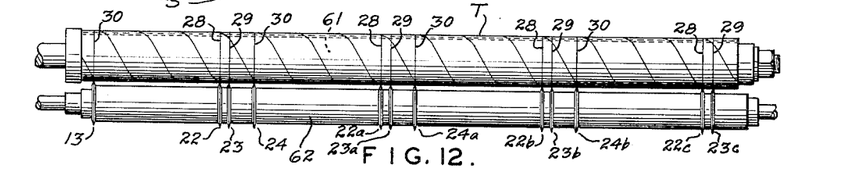
FIG. 12 is a schematic view illustrating apparatus for performing the first step in the operation of another method of forming a can body.

After the tube is removed from the apparatus shown in FIG. 7, it can be separated into individual sections, such as, T–1 shown in FIG. 10. In each of these individual sections, the tubes will separate along the lines 30—58 at the right hand, and along the score lines 58—30 at the opposite end, so as, to leave individual tube sections with an internally stepped-end 30—58 and an externally stepped-end 58—30.

Figure 25:
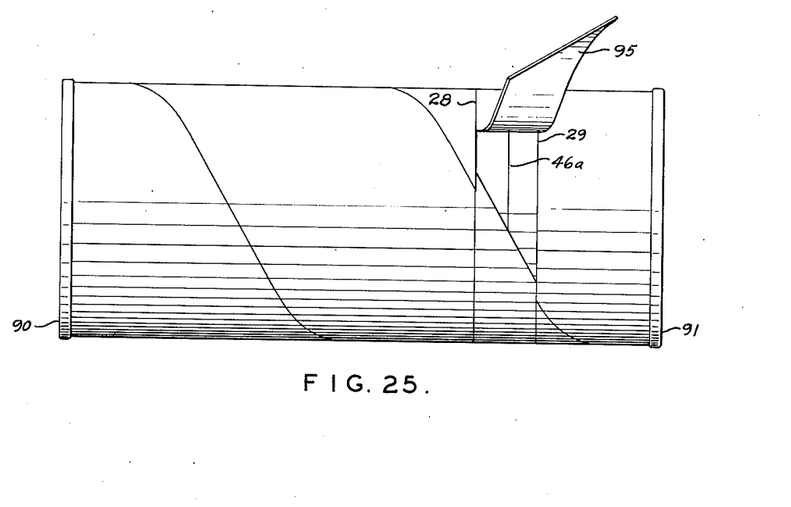
FIG. 25 is a side elevation of a completed can, illustrating the initial opening step of operating the tear strip.
Figure 26:
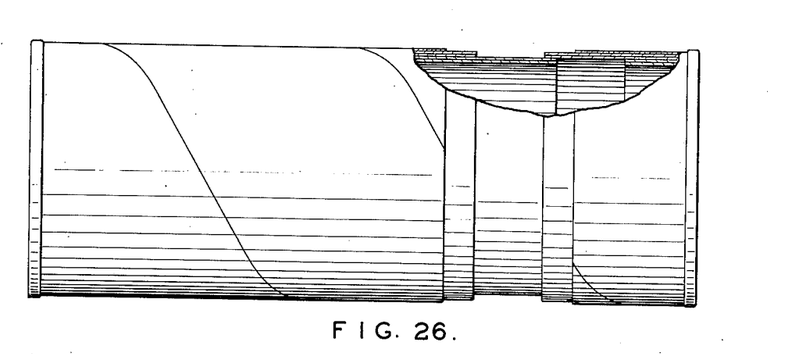
FIG. 26 is a side elevation of a can formed by the disclosed method, with the tear strip removed and the cover displaced, to illustrate the telescoping relation of the parts of the cover and the can body.

In the final step, the inner tube with plies 1 and 2, is forced end-wise with respect to the outer tube, with plies 3, 4, and 5, so as, to bring ends of the two tubes into alignment. It will be noted that, this operation separates the score 46 into two parts, 46a and 46b. The score 46a being through the outer tube, and the score 46b being through the inner tube, so as, to define a telescopic section between, the score marks 46a, 46b and the line of separation between the two tubes, the inner tube and the outer tube. The finished tube, also, has the two scores 28 and 29, which define a tear strip in the wrapper. All as shown in FIGS. 25 and 26. When the can ends are applied to the tube in FIG. 11, a complete container with a telescopic section is formed.

*First Alternative Method*

It will be obvious to those skilled in the art that all of the internal cutting steps and all of the external cutting steps may be consolidated into two separate operations.

For the purpose of illustration, this consolidation of cuts is illustrated as, a second preferred series of operations for forming the can body. In illustrating these operations, corresponding parts for the apparatus and the product, will be given the same reference character, so that, it will become evident how the consolidation is effected.

FIGS. 12 through 18 inclusive, are illustrative. Thus, in FIG. 12, the tube T is mounted on a mandrel 61, and rotated with the mandrel during the cutting operation. Mandrel 62 is movably mounted adjacent thereto and carries a series of knives 13, 22, 23, 24, 23a and 24a, 22b, 23b and 24b, 22c and 23c, in fact, all of the knives necessary to perform all of the outside cuts.

Figure 14:
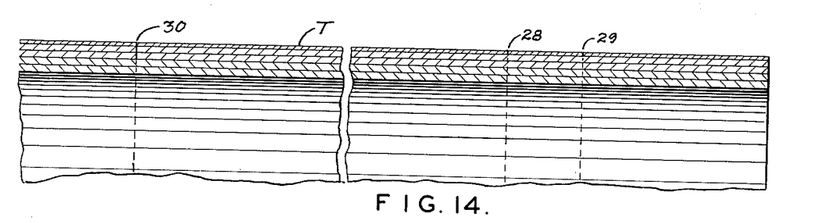
FIG. 14 is a fragmentary view in section on an enlarged scale, illustrating the tube after completion of the first step of the operation, in the alternative method.

When the mandrel 62 is moved into contact with the tube T on the mandrel 61, all of the outside cuts are performed at once, for example, knife 13 forms cut 30, knives 22, 23 and 24 perform the cuts 29 and 30, etc. FIG. 14, illustrates the cuts in the tube T performed by the series of knives on the mandrel 62.

Figure 13:
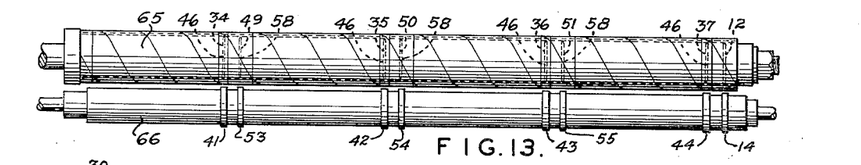
FIG. 13 is a schematic view illustrating an apparatus for performing the second step, in the alternative method of performing the can body.

After the tube is removed from the mandrel 61, it is placed on the mandrel 65 which carries all of the internal knives, 34, 49, 35, 50, 36, 51, 46 and 12.

On the mandrel 66 are the opposed rollers, 41, 53, 42, 54, 43, 55, 44 and 14.

Figure 15:
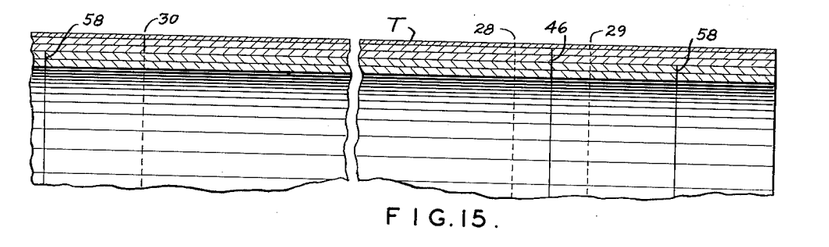
FIG. 15 is a fragmentary sectional view on an enlarged scale, illustrating the tube after completion of the second step in the operation, in the alternative method.

The internal knives 34, 49, form the cuts 46 and 58. The knives 35 and 50 form the cuts 46, 58. The internal knives 36, 51 form the cuts 46 and 58 and internal knife 37 forms the cut 46. The internal knife 12, however, forms one of the inside cuts 58, all as illustrated in FIG. 15.

Figure 16:
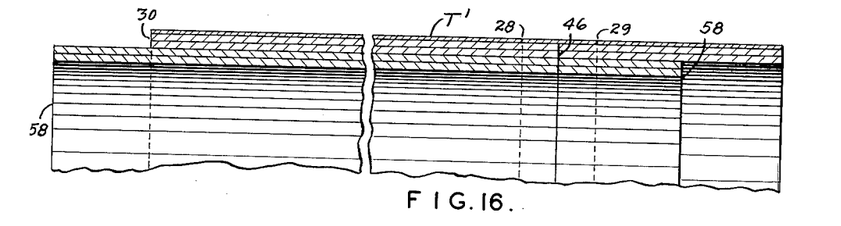
FIG. 16 is a fragmentary view in enlarged section illustrating, a single tube, when separated, to form a final single can body.
Figure 17:
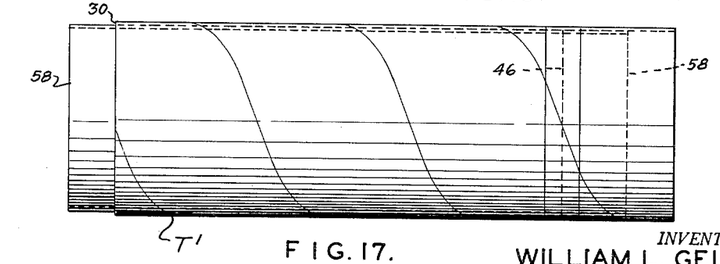
FIG. 17 is a side view corresponding with, FIG. 16.
Figure 18:
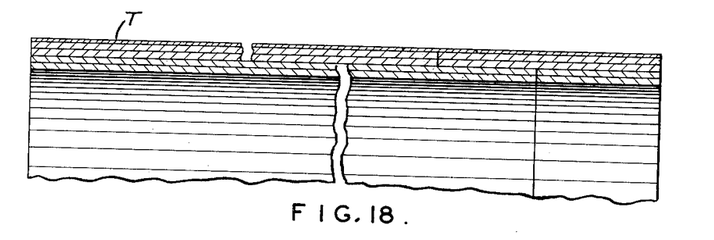
FIG. 18 is a fragmentary enlarged view in section, illustrating the completed can body.

After the tube T is removed from the mandrel 65, it is then separated into individual tubes T–1, etc., one of which is shown in FIG. 16. The individual tubes are separated along the lines 30, 58, so as, to form an externally stepped-end at the left and an internally stepped-end at the right. In the final step, FIG. 18, the inner tube is slid endwise of the outer tube, so as, to form the telescopic section. FIG. 17, illustrates in side elevation one of the tubes after separation into individual can bodies.

*Alternative Form*

In FIGS. 19 through 24, inclusive, applicant shows still another series of steps illustrating operations in the second alternative method.

Figure 19:
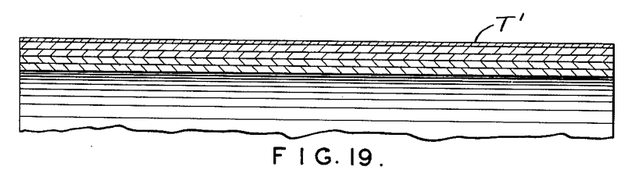
FIG. 19 is an enlarged fragmentary view, in section, of a tube as it leaves the winding machine, to which is applied, the steps of the second alternative method.
Figure 20:
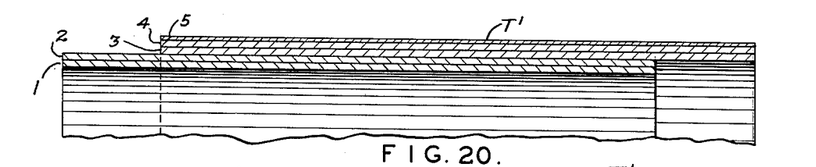
FIG. 20 is an enlarged fragmentary view in section of a tube illustrating the first step in the second alternative method.

In this method, the tube as it leaves the winding machine, is cut into can lengths by the flying knife K, and starting at this point the method comprises, a first step in which the tube T–1 has the inner tube comprising the plies 1 and 2, slid end-wise with respect to the outer tube, composed of plies 3, 4 and 5.

Figure 21:
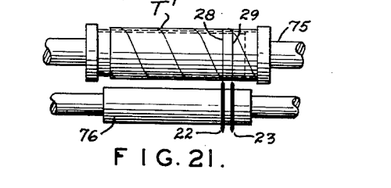
FIG. 21 is a schematic illustration of the apparatus for carrying out the second step of the second alternative method.
Figure 22:
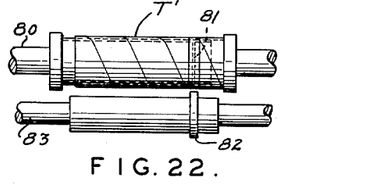
FIG. 22 is a schematic representation of the apparatus for carrying out the third step of the second alternative method.
Figure 23:
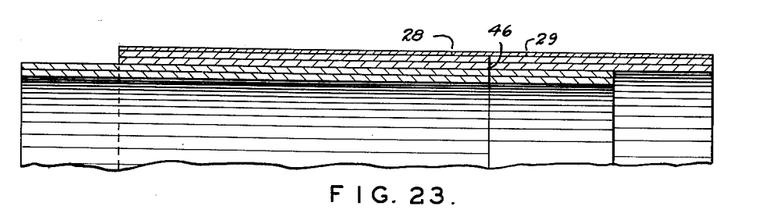
FIG. 23 is an enlarged fragmentary view, in section, illustrating a single can body after completion of the first three steps, of the second alternative method.
Figure 24:
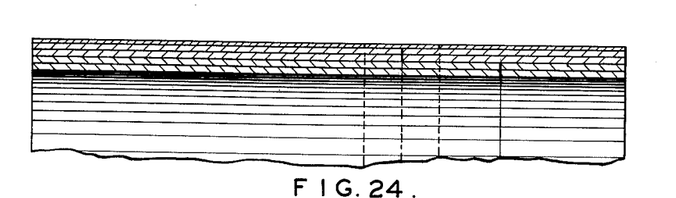
FIG. 24 is an enlarged fragmentary view, in section, illustrating a single can body after completion of the fourth step, of the second alternative method.

The individual tubes T–1 are then mounted on the mandrel, such as, illustrated in FIG. 21, as 75, which engages the opposite ends of the can body and rotates the same between its flanges. On the mandrel 76 are a pair of knives, heretofore, indicated as 22 and 23, which form the score marks 28 and 29 in the outside wrapper or cover for the tear strip. The tube T–1 is then removed from the mandrel 75 and placed on the mandrel 80, which carries a knife 81. Backing roller 82 on mandrel 83, presses the tube T–1 against the knife 81 to form the internal cut 46, as before described. The product resulting from the combined cutting operations above described appears as shown in FIG. 23, which has an inside cut 46 and scores 28 and 29. As the final step in this method, the inner tube is forced into alignment with the outer tube as shown in FIG. 24, so as, to form a telescoping section in a tube for a can body.

Product Produced by Methods

Regardless of which of the methods heretofore described are employed, the result is a can such as illustrated, in FIGS. 25 and 26. After the can ends 90 and 91 have been applied, the completed product has a tear strip 95 defined by the score lines 28 and 29. When the tear strip 95 is completely removed, it uncovers the score line 46a. The telescoping section is formed between the score line 46a and the score line 46b, and the cover can be removed by a twist and pull action, so as, to provide easy access to the contents of the can. As shown in FIG. 26, the construction of the tube for the can body makes it possible to secure the end covers 90 and 91 to all of the plies, thereby, forming a very strong container.

It is contemplated that other modifications to the methods herein disclosed will occur to those skilled in the art which come within the scope of the following claims.

I claim:

1. The method of manufacturing a paper can body with a telescoping section secured by a unitary cover from a paper tube constructed by simultaneously winding a plurality of paper tapes into a paper tube of a plurality of plies of paper to form a separate inner tube within a separate outer tube with a cover, comprising the steps of forming stepped ends on said paper tube, so that the inner tube projects from one end and the outer tube from the opposite end, to form a tube with an internally stepped end and an externally stepped end, making a circumferential cut intermediate the length of the tube from the inside of said tube outwardly to the outer ply or cover on the outer tube, and then slipping the inner tube, with respect to the outer tube to eliminate the stepped ends to form the paper can body with the telescoping section concealed by an outer ply forming the unitary cover.

2. The method of manufacturing a paper can body with a telescoping section secured by a unitary cover having a tear strip from a paper tube constructed by simultaneously winding a plurality of plies of paper to form a separate inner paper tube within a separate outer paper tube, comprising the steps of forming stepped ends on said tube to form a tube in which the outer tube projects beyond the inner tube at one end and the inner tube projects beyond the outer tube at the opposite end to form a paper tube with an internally stepped end and an externally stepped end respectively, making a circumferential cut intermediate the length of the tube from the inside of said tube through the inner tube and the outer tube, making a pair of spaced circumferential scores from the outside of said tube through one outer ply on opposite sides of said internal circumferential cut, and then slipping the inner tube with respect to the outer tube, to eliminate the stepped ends to form the paper can body with a telescoping section and a scored tear strip in the outer ply located over the cut in the outer tube defining one end of the telescoping section of said tube.

3. The method of manufacturing a paper can body with a telescoping section concealed by a label or cover, from a paper tube formed from a plurality of wound plies of paper secured into a paper tube having a paper ply inner tube, separate and within a paper ply outer tube with a cover ply or label, comprising the steps of forming stepped ends on said paper tube so that said outer tube projects beyond said inner tube at one end and said inner tube projects beyond said outer tube at the opposite end so that said tube has an externally stepped end and an internally stepped end, making a circumferential cut intermediate the length of said tube from the inside through the inner tube and the outer tube to said cover ply, and then applying oppositely directed forces to said inner and said outer tubes to slip the ends of said tubes toward alignment to form the paper can body with the telescoping section concealed by an imperforate cover ply.

4. In the method of manufacturing a paper can body with a telescoping section concealed by a label or cover, from a paper tube formed from a plurality of helically wound plies of paper secured into a cylinder having a paper ply inner tube separate and within an outer tube of separate plies secured together, one of which is a label or cover, comprising the steps of forming stepped ends on said paper tube so that said outer tube projects beyond said inner tube at one end and said inner tube projects beyond said outer tube at the opposite end so that said tube has an externally stepped end and an internally stepped end, and then making a circumferential cut intermediate the length of said tube from the inside through the inner tube and the outer tube to said cover ply.

5. The method of manufacturing a paper can body with a telescoping section concealed by a label or cover, from a paper tube formed from a plurality of helically wound plies of paper secured into a paper tube having a paper ply inner tube separate and within an outer tube of separate plies secured together, one of which is a label or cover ply, comprising the steps of forming stepped ends thereon by cutting opposite ends of said paper tube for removing a part of the inner tube at one end of the paper tube and part of the outer tube at the opposite end so that said paper tube has an externally stepped end and an internally stepped end, making a circumferential cut intermediate the length of said tube from the inside through the inner tube and the outer tube to said cover ply, and then applying oppositely directed forces to said inner and said outer tubes to slip the ends of said tubes toward alignment to form the paper can body with the telescoping section concealed by said cover or label.

6. In the method of manufacturing a paper can body with a telescoping section concealed by a label or cover, from a paper tube formed from a plurality of helically wound plies of paper to make a body with an inner tube separate and slidable within an outer tube which has a label or cover, comprising the steps of forming stepped ends on said paper tube so that said outer tube projects beyond said inner tube at one end and said inner tube projects beyond said outer tube at the opposite end so that said paper tube has an externally stepped end and an internally stepped end, making a circumferential cut intermediate the length of said tube from the inside through the inner tube and the outer tube to said cover ply and making a circumferential perforation in said cover ply from the outside through said cover ply opposite said internal cut to form a separation line adjacent said internal cut.

7. The method of manufacturing a paper can body with a telescoping section concealed by a label or cover from a paper tube formed from a plurality of helically wound plies of paper secured into a paper tube having a paper ply inner tube separate and within an outer tube of separate plies secured together, one of which is a label or cover, comprising the steps of forming stepped ends on said paper tube so that said outer tube projects beyond said inner tube at one end and said inner tube projects beyond said outer tube at the opposite end so that said paper tube has an externally stepped end and an internally stepped end, making a circumferential cut intermediate the length of said tube from the inside through the inner tube and the outer tube to said cover ply, making a circumferential perforation in said cover ply from the outside through said cover ply opposite said internal cut to form a separation line adjacent said internal cut, and then applying a force to opposite ends of said paper tube to slip the ends of the inner and outer tubes toward alignment to form the paper can body with the telescoping section between the plies forming said inner and said outer tubes concealed by said cover ply.

8. In the method of manufacturing a paper can body with a telescoping section concealed by a label or cover from a paper tube formed from a plurality of helically wound plies of paper secured into a paper tube having a paper ply inner tube separate and within an outer tube of separate plies secured together, one of which is a label or cover, comprising the steps of forming stepped ends on said paper tube so that said outer tube projects beyond said inner tube at one end and said inner tube projects beyond said outer tube at the opposite end so that said paper tube has an externally stepped end and an internally stepped end, making a circumferential cut intermediate the length of said tube from the inside through the inner tube and the outer tube to said cover ply, and making a pair of circumferential scores in said cover ply from the outside through said cover ply on opposite sides of said first cut to form a tear strip over said first cut.

9. The combination of steps as defined in the preceding claim 8 including the step of applying a force to opposite ends of the inner and outer tubes to slip the ends of said tubes toward alignment to form the paper can body with the telescoping section between the plies forming said inner and said outer tubes concealed by said tear strip.

10. In the method of manufacturing a paper can body with a telescoping section concealed by a label or cover, from a paper tube formed from a plurality of helically wound plies of paper secured into a paper tube, having a paper ply inner tube separate and within an outer tube of separate plies secured together, one of which is a label or cover ply, comprising the steps of forming stepped ends thereon by internal and external cutting operations on the opposite ends of said paper tube for removing a part of the inner tube at one end of the paper tube and a part of the outer tube at the opposite end of the paper tube so that said paper tube has an externally stepped end and an internally stepped end, making a circumferential cut intermediate the length of said paper tube from the inside through the inner tube and the outer tube to said cover ply, and making a circumferential perforation into said cover ply from the outside through said cover ply opposite said internal cut to form a separation line adjacent said internal cut.

11. The method of manufacturing a paper can body with a telescoping section concealed by a label or cover, from a paper tube formed from a plurality of helically wound plies of paper secured into a paper tube having a paper ply inner tube separate and within an outer tube of separate plies secured together, one of which is a label or cover ply, comprising the steps of forming stepped ends thereon by internal and external cutting operations on the opposite ends of said paper tube removing a part of the inner tube at one end of the paper tube and a part of the outer tube at the opposite end of the paper tube so that said paper tube has an externally stepped end and an internally stepped end, making a circumferential cut intermediate the length of said tube, from the inside through the inner tube and the outer tube to said cover ply, making a circumferential perforation in said cover ply from the outside through said cover ply opposite said internal cut to form a weakened separation line in said cover ply adjacent said internal cut, and then applying a force to opposite ends of said paper tube to slip the ends of the inner and outer tubes toward alignment to form the paper can body with a telescoping section concealed by said cover ply.

12. In the method of manufacturing a paper can body with a telescoping section concealed by a label or cover, from a paper tube formed from a plurality of helically wound plies of paper secured into a paper tube having a paper ply inner tube separate and within an outer tube of separate plies secured together, one of which is a label or cover ply, comprising the steps of forming stepped ends thereon by internal and external cutting operations on the opposite ends of said paper tube removing a part of the inner tube at one end of the paper tube and a part of the outer tube at the opposite end of said paper tube so that said paper tube has an externally stepped end and an internally stepped end, making a circumferential cut intermediate the length of said tube from the inside through the inner tube and the outer tube to said cover ply, and making a pair of circumferential scores in said cover ply from the outside through said cover ply on opposite sides of said internal cut to form a tear strip over said internal cut.

13. The method of manufacturing a paper can body with a telescoping section concealed by a label or cover, from a paper tube formed from a plurality of helically wound plies of paper secured into a paper tube having a paper ply inner tube separate and within an outer tube of separate plies secured together, one of which is a label or cover ply, comprising the steps of forming stepped ends thereon by internal and external cutting operations on said opposite ends of said paper tube removing a part of the inner tube at one end of the paper tube and a part of the outer tube at the opposite end of the paper tube so that said paper tube has an externally stepped end and an internally stepped end, making a circumferential cut intermediate the length of said tube to said cover ply, making a pair of circumferential scores in said cover ply from the outside through said cover ply on opposite sides of said intermediate cut to form a tear strip over said intermediate cut, and then applying a force to opposite ends of said paper tube to slip the ends of the inner and outer tubes toward alignment to form the paper can body with the telescoping section concealed by said tear strip.

14. The method of manufacturing paper can bodies with telescoping sections concealed by a label or cover from a length of paper tube formed from a plurality of wound plies of paper secured into a paper tube having a paper ply inner tube, separate and within a paper ply outer tube with a cover ply or label, comprising the steps of forming stepped ends thereon by an external cutting operation on one end of said paper tube and an internal cutting operation on the opposite end of the paper tube so that said outer tube projects beyond said inner tube at one end and said inner tube projects beyond said outer tube at the opposite end so that said paper tube has an externally stepped end and an internally stepepd end, making spaced pairs of circumferential cuts externally along the length of said paper tube into said cover ply, making a plurality of circumferential cuts externally along the length of the paper tube between said pairs of cuts through said outer plies to said inner tube, making circumferential cuts intermediate the length of said paper tube from the inside through the inner tube and the outer tube to said cover ply between each of said pairs of external cuts, making a plurality of circumferential cuts internally of and spaced along the paper tube through said inner tube to said outer tube adjacent said pairs of external cuts and spaced from said external cuts to define stepped ends for individual can bodies on opposite sides of said external and internal cuts, separating said paper tube at said last cuts into individual can bodies, and then applying oppositely directed forces to said inner and said outer tubes to slip the ends of said tubes toward alignment to form a telescoping section concealed by said cover ply.

15. The method as defined in claim 14 wherein all of the external cutting steps are performed substantially simultaneously and all of the internal cutting steps are performed substantially simultaneously.

16. In the method of manufacturing a paper can body with a telescoping section concealed by a label or cover from a continuously formed paper tube of helically wound plies of paper secured into a paper tube and having a paper ply inner tube, separate and within a paper ply outer tube with a cover ply or label, comprising the steps of cutting said continuously formed paper tube into individual tubes of the length of a can body, applying oppositely directed forces to said inner and said outer tubes to slip the ends of said inner tubes with respect to said outer tubes so that said can tube forming a can body has an externally stepped end and an internally stepped end, making a circumferential cut intermediate the length of each of said tubes from the inside through the inner tube and outer tube to said cover ply and making a circumferential score in said cover ply from the outside through said cover ply opposite said internal cut to form a weakened separation line in said cover ply adjacent said internal cut.

17. The method of manufacturing paper can bodies with telescoping sections concealed by a label or cover from a continuously formed paper tube helically wound with a plurality of plies of paper secured into a paper tube having a separate paper ply inner tube, within a paper ply outer tube with a cover ply or label comprising the steps of cutting the continuously formed paper tube into tube sections long enough for an individual can body, applying oppositely directed forces to said inner tube and said outer tube to slip one of the tubes with respect to the other so that said paper tube has an externally stepped end and an internally stepped end, making circumferential cuts intermediate the length of said paper tube from the inside through the inner tube and the outer tube to said cover ply and slipping said tubes relative to one another toward alignment to form the paper can body with a telescoping section concealed by said cover ply.

18. The method of manufacturing paper can bodies with telescoping sections concealed by a label or cover from a continuously formed paper tube of helically wound plies of paper secured into a paper tube having a separate paper ply inner tube within a paper ply outer tube with a cover ply or label, comprising the steps of cutting said continuously formed paper tube into sections long enough for a can body, applying opposite forces to said inner and said outer tubes to slip said tubes relative to one another so that said tube has an externally stepped end and an internally stepped end, making a circumferential cut in each tube intermediate the length of said tube from the inside through the inner tube and the outer tube to said cover ply, applying oppositely directed forces to said inner and said outer tubes to slip said tubes relative to one another in a direction to move the ends of said tubes toward alignment to form the paper can body with a telescoping section concealed by said cover ply and then scoring said cover ply adjacent said internally formed cut to form a weakened section for separation of said cover ply adjacent said internal cut.

19. The method of manufacturing a paper can body with a telescoping section concealed by a label or cover from a paper tube wound with plies of paper to form a separate paper inner tube within a separate outer paper tube with a cover ply or label thereon, in which the outer paper tube projects beyond said inner tube at one end and said inner tube projects beyond said outer tube at the opposite end to form a tube with an internally stepped end and an externally stepped end respectively, comprising the steps of making a circumferential cut intermediate the length of said tube from the inside through said inner tube and said outer tube to said cover ply, and then applying oppositely directed forces to said inner and outer tubes to slip the ends of said tubes toward alignment to form the paper can body with displaced internal circumferential cuts for the telescoping section concealed by said imperforate cover ply.

20. The method of manufacturing a paper can body with telescopic section concealed by a label or cover from a paper tube wound with plies of paper to form a separate paper inner tube within a separate outer paper tube with a cover ply or label thereon, in which the outer paper tube projects beyond the inner paper tube at one end to form a tube with an internally stepped end, comprising the steps of making a circumferential cut intermediate the length of said tube from the inside through said inner tube and said outer tube to said cover ply, and then applying oppositely directed forces to said inner and outer tubes to slip the said tubes relative to one another to form the paper can body with displaced internal circumferential cuts through the inner and outer plies respectively for the telescoping section.

21. The method of manufacturing a paper can body with a telescoping section concealed by a label or cover from a paper tube wound with plies of paper to form a separate paper inner tube slidable within a separate outer paper tube which has a cover ply or label thereon, in which said inner paper tube projects beyond said outer tube at one end to form a tube with an externally stepped end, comprising the steps of making a circumferential cut intermediate the length of said paper tube from the inside through said inner tube and said outer tube to said cover ply, and then applying oppositely directed forces to said inner and outer tubes to slip the tubes relative to one another and thereby form the paper can body with displaced internal circumferential cuts for the telescoping section concealed by an imperforate cover ply.

22. In the method of manufacturing a paper can body with a telescoping section concealed by a label or cover, from a paper tube formed from a plurality of paper plies separately wound and secured together into a cylinder having a paper ply inner tube slidable within an outer tube of separate plies secured together one of which is a label or cover, comprising the steps of forming a stepped end on said paper tube so that said outer tube projects beyond said inner tube to form an internally stepped end thereon, and then making a circumferential cut intermediate the length of said tube from the inside through the inner tube and the outer tube to said cover ply.

23. In the method of manufacturing a paper can body with a telescoping section concealed by a label or cover, from a paper tube formed from a plurality of separately wound plies of paper secured into a cylinder having a paper ply inner tube slidable within an outer tube of separate plies secured together one of which is a label or cover, comprising the steps of forming a stepped end on said paper tube so that said inner tube at one end projects beyond said outer tube to form an externally stepped end on said tube, and then making a circumferential cut intermediate the length of said tube from the inside through the inner tube and the outer tube to said cover ply.

24. The method of manufacturing a paper can body with a telescoping section concealed by a label or cover, from a paper tube formed of separately wound plies of paper secured into a paper tube having a paper ply inner tube slidable within an outer tube of separate plies secured together one of which is a label or cover ply, comprising the steps of forming a stepped end on said paper tube so that the inner tube projects beyond the outer tube to form an externally stepped end on said paper tube, making a circumferential cut intermediate the length of the tube from the inside of said tube outwardly to the outer ply or cover on the outer tube, and then slipping the inner tube with respect to the outer tube to displace the cut in the inner tube intermediate its ends with respect to the cut in the outer tube intermediate its ends to form the paper can body with the telescoping section concealed by the cover.

25. The method of manufacturing a paper can body with a telescoping section concealed by a label or cover, from a paper tube formed from a plurality of separately wound plies of paper secured into a cylinder having a paper ply inner tube slidable within an outer tube of separate plies secured together one of which is a label or cover, comprising the steps of forming a stepped end on said paper tube so that said outer tube projects from one end beyond said inner tube to form a tube with an internally stepped end, making a circumferential cut intermediate the length of the tube from the inside of said tube outwardly to the outer ply or cover on the outer tube, and then slipping the inner tube with respect to the outer tube to displace the cut in the inner tube intermediate its length from the cut in the outer tube intermediate its length to form the paper can body with the telescoping section concealed by the cover.

26. The method of manufacturing a paper can body with a telescoping section concealed by a label or cover from a paper tube wound with plies of paper to form a separate paper inner tube slidable within a separate outer paper tube having a cover ply or label thereon, comprising the steps of making a circumferential cut intermediate the length of said tube from the inside through said inner tube and said outer tube to said cover ply, and then applying oppositely directed forces to said inner and outer tubes to slip said tubes endwise relative to one another to form a paper can body in which the cut through the inner ply is offset from the cut through the outer ply thereby displacing the internal circumferential cuts for the telescoping section concealed by an imperforate cover ply.

References Cited in the file of this patent
UNITED STATES PATENTS

| | | |
|---|---|---|
| 1,390,644 | Ritchie | Sept. 13, 1921 |
| 2,906,180 | Bracht | Sept. 29, 1959 |
| 2,966,101 | Fienup | Dec. 27, 1960 |

UNITED STATES PATENT OFFICE
CERTIFICATE OF CORRECTION

Patent No. 3,036,503                                        May 29, 1962

William L. Geist

It is hereby certified that error appears in the above numbered patent requiring correction and that the said Letters Patent should read as corrected below.

Column 10, line 41, for "stepepd" read -- stepped --; line 67, after "a", second occurrence, insert -- separate --; line 68, strike out "separate and".

Signed and sealed this 16th day of October 1962.

(SEAL)
Attest:

ERNEST W. SWIDER                                    DAVID L. LADD
Attesting Officer                                        Commissioner of Patents